J. W. Wheeler.
Window Blind.
Nº 93,934.  Patented Aug. 17, 1869.
Fig: 1
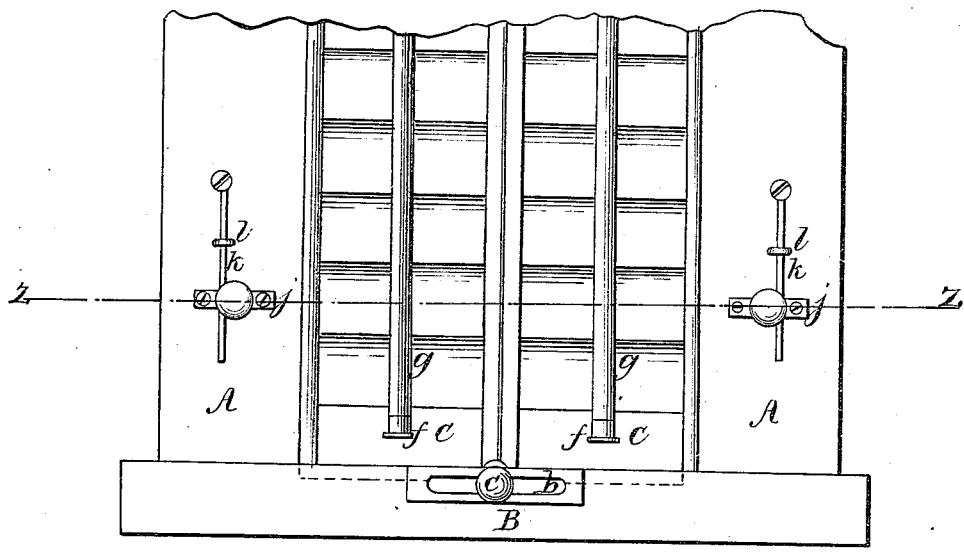
Fig: 2
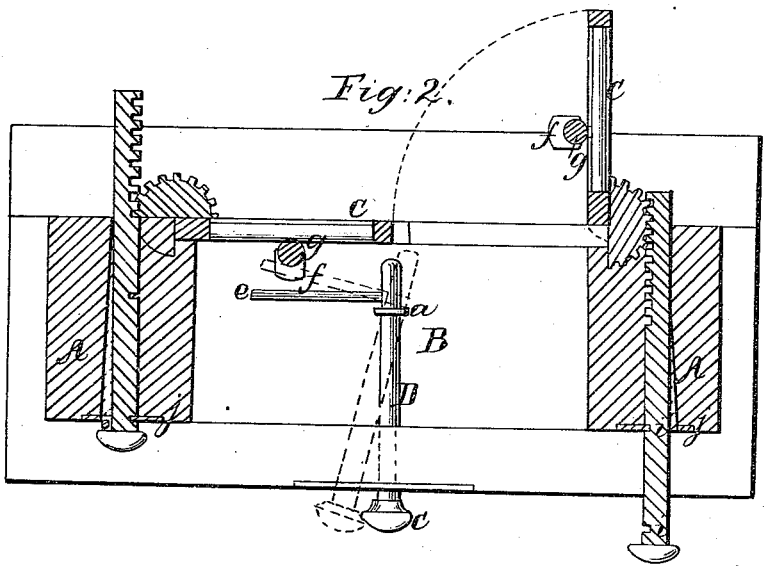
Witnesses:
Geo. Q. Rothwell
Phil. F. Larner
Inventor:
Jacob W. Wheeler
Per _____ Attys

United States Patent Office.

JACOB W. WHEELER, OF NORTH URBANA, NEW YORK.

Letters Patent No. 93,934, dated August 17, 1869.

IMPROVED SHUTTER-WORKER.

The Schedule referred to in these Letters Patent and making part of the same.

*To all whom it may concern:*

Be it known that I, JACOB W. WHEELER, of North Urbana, in the county of Steuben, and State of New York, have invented a new and useful Improvement in Operating Window-Blinds; and I do hereby declare that the following is a full, clear, and exact description thereof, sufficient to enable others skilled in the art to which my invention appertains, to make and use the same, reference being had to the accompanying drawings, making a part of this specification, and in which—

Figure 1 is a front view of the shutter from the inside, and

Figure 2 is a horizontal section through the line z z, fig. 1.

Similar letters of reference indicate like parts in the two figures.

In cold, wet weather, window-shutters frequently become frozen together or to the sill, and considerable exertion is required in order to open them.

Heretofore it has been necessary to raise the sash and open the shutters by outward pressure, or by repeated blows.

It has been found that when the shutters are provided with the device of a rack and pinion, operated from the inside, it is almost impossible to open the shutters, when frozen together, without raising the sash and forcing out the shutters.

The reason of this is, that the power being applied at the rear side of the shutter, the leverage is not sufficient to open the shutters when frozen together, or at the bottom.

The object of this invention is to obviate the difficulties above set forth, and provide means whereby shutters, especially those operated by the rack-and-pinion device, can be forced open when frozen together, or to the window-sill, and whereby the blind slats can be regulated, without the necessity of raising the sash.

The invention consists in the employment of a bar, which has lateral, longitudinal, and rolling movements, being held to the window-sill, inside the shutters, by a single staple, and having a knob on its inner end, by means of which the bar is operated in a slot, to force open the shutters and control the blind-slats, the bar for the latter purpose being provided with an offset, which acts on a foot attached to the rod which connects the slats of the blind together.

My invention will be fully understood by reference to the accompanying drawings, considered in connection with the following detail description.

In the drawings—

A A represent the side-pieces of the window-frame;

B, the sill; and

C C, the shutters.

D represents a bar, held to the window-sill by means of a single staple, $a$, which allows it to be moved, as shown in red lines, besides permitting its longitudinal movement.

This bar works in a slot, $b$, in the window-sill, and is provided, at its inner end, with a knob, $c$.

This bar is used for loosening the shutters, when frozen together or to the sill, and this is effected by moving the bar to the position shown in red, and then forcing it out by pressure or strokes on the knob One shutter is thus loosened, and the bar may then be adjusted so as to operate on the other shutter, and free the same.

If the shutters have no catches, it will not be necessary to raise the sash in order to loosen the shutters.

This improvement is especially applicable to shutters which are operated by the well-known rack-and-pinion or segment device.

Shutters operated by these means seldom, if ever, have any catches whereby they are fastened to the sill; therefore, in order to open the shutters, it is only necessary to loosen them, as above described, and then open them to any desired extent, by drawing on the rack-bars, all of which can be done without raising the sash.

It is almost, if not quite impossible to open shutters by means of the rack and toothed segment device, when the shutters are frozen together.

If an attempt is made to open them when in this condition, the operating-devices will be subjected to great and injurious strain.

The second part of my invention relates to a device for operating blind-slats, without the necessity of raising the sash.

For this purpose I provide the bar D with an offset, $e$, or arm, fixed on said bar, at right angles thereto.

This arm $e$ is made to come in contact with feet $f$, attached to the strips $g$, which connect the blind-slats together, by moving the bar as indicated in red lines, fig. 2.

By this means the slats may be either opened or closed, as will be obvious.

Having thus described my invention, I wish to state that I do not claim operating window-shutters by means of a rack sliding in a recess in the window-casing, and gearing with a pinion or toothed segment attached to the shutter; but

What I do claim as new, and desire to secure by Letters Patent, is—

The bar D, with an arm, $e$, when so held to the sill as to be capable of longitudinal, lateral, and rolling motion, for forcing open the shutters, and operating the blind-slats by means of the projections $f$, without raising the sash, in the manner substantially as described.

To the above specification of my improvement in window-blinds, I have signed my name, this 2d day of March, 1869.

JACOB W. WHEELER.

Witnesses:
MELINDA BENNITT,
LEVI S. CHASE.